(12) United States Patent
Miller et al.

(10) Patent No.: US 8,230,752 B2
(45) Date of Patent: Jul. 31, 2012

(54) AUTOMATIC GROUP TRANSMISSION

(75) Inventors: Martin Miller, Immenstaad (DE);
    Bernd Doebele, Salem (DE); Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 12/528,482

(22) PCT Filed: Feb. 22, 2008

(86) PCT No.: PCT/EP2008/052163
§ 371 (c)(1),
(2), (4) Date: Aug. 25, 2009

(87) PCT Pub. No.: WO2008/107317
PCT Pub. Date: Sep. 12, 2008

(65) Prior Publication Data
US 2010/0319485 A1    Dec. 23, 2010

(30) Foreign Application Priority Data
Mar. 6, 2007  (DJ) .......................... 10 2007 010 828

(51) Int. Cl.
*F16H 3/08* (2006.01)
(52) U.S. Cl. ........................................... 74/331; 74/333
(58) Field of Classification Search ................ 74/331, 74/333
See application file for complete search history.

(56) References Cited

U.S. PATENT DOCUMENTS

| 3,508,450 | A | | 4/1970 | Richards | |
|---|---|---|---|---|---|
| 5,351,569 | A | * | 10/1994 | Trick et al. | 74/329 |
| 5,823,051 | A | * | 10/1998 | Hall, III | 74/325 |
| 6,257,082 | B1 | * | 7/2001 | Ore | 74/336 R |
| 6,440,032 | B1 | | 8/2002 | Stauber et al. | |
| 6,718,841 | B1 | * | 4/2004 | Schepperle | 74/359 |
| 7,021,170 | B2 | | 4/2006 | Dobele | |

FOREIGN PATENT DOCUMENTS

| DE | 198 31 293 A1 | 1/2000 |
|---|---|---|
| DE | 101 43 994 A1 | 3/2003 |
| DE | 101 52 857 A1 | 5/2003 |
| EP | 1 055 845 A2 | 11/2000 |

OTHER PUBLICATIONS

ATZ Sep. 2004, pp. 772-783.

* cited by examiner

*Primary Examiner* — Ha D. Ho
(74) *Attorney, Agent, or Firm* — Davis & Bujold, P.L.L.C.

(57) ABSTRACT

An automated group transmission having a multi-stage main transmission (HG), a splitter group (VG) connected upstream from the main transmission (HG) and a two-stage range-change group (BG) connected downstream of the main transmission (HG), such that the splitter group (VG) is connected, via a controllable separator clutch, to a drive motor. The main transmission (HG) and the range-change group (BG) are of either a synchronized or an unsynchronized design and the shifting clutches of two respective transmission ratio steps, in at least one of the partial-transmissions (VG, HG, BG), are respectively combined in a common shifting packet with two shift positions and a neutral position. To speed up most range shifts, it is provided that in the main transmission (HG) the shifting clutches associated with the lowest transmission ratio step (G1) and with the highest transmission ratio step (G4 or G3) are combined in a common shifting packet (S1/4 or S1/3).

5 Claims, 6 Drawing Sheets

| GEAR STEP | INVENTIVE CONFIGURATION WITH 16 GEARS | |
|---|---|---|
| 1 GEAR | 8<-->9 | GATE S1/4 |
| 2 GEAR | 7<-->9 | GATE S1/4 |
|  | 8<-->10 | GATE S1/4 |
| 3 GEAR | 6<-->9 | GATE S1/4<-->GATE S2/3 |
|  | 7<-->10 | GATE S1/4 |
|  | 8<-->11 | GATE S1/4<-->GATE S2/3 |
| 4 GEAR | 5<-->9 | GATE S1/4<-->GATE S2/3 |
|  | 6<-->10 | GATE S1/4<-->GATE S2/3 |
|  | 7<-->11 | GATE S1/4<-->GATE S2/3 |
|  | 8<-->12 | GATE S1/4<-->GATE S2/3 |

Fig. 2a

| GEAR STEP | INVENTIVE CONFIGURATION WITH 12 GEARS | |
|---|---|---|
| 1 GEAR | 6<-->7 | GATE S1/3 |
| 2 GEAR | 5<-->7 | GATE S1/3 |
|  | 6<-->8 | GATE S1/3 |
| 3 GEAR | 4<-->7 | GATE S1/3<-->GATE S2/R |
|  | 5<-->8 | GATE S1/3 |
| 4 GEAR | 3<-->7 | GATE S1/3<-->GATE S2/R |
|  | 4<-->8 | GATE S1/3<-->GATE S2/R |

Fig. 2b

| GEAR STEP | STANDARD CONFIGURATION WITH 16 GEARS | |
|---|---|---|
| 1 GEAR | 8<-->9 | GATE S3/4<-->GATE S1/2 |
| 2 GEAR | 7<-->9 | GATE S3/4<-->GATE S1/2 |
|  | 8<-->10 | GATE S3/4<-->GATE S1/2 |
| 3 GEAR | 6<-->9 | GATE S3/4<-->GATE S1/2 |
|  | 7<-->10 | GATE S3/4<-->GATE S1/2 |
|  | 8<-->11 | GATE S3/4<-->GATE S1/2 |
| 4 GEAR | 5<-->9 | GATE S3/4<-->GATE S1/2 |
|  | 6<-->10 | GATE S3/4<-->GATE S1/2 |
|  | 7<-->11 | GATE S3/4<-->GATE S1/2 |
|  | 8<-->12 | GATE S3/4<-->GATE S1/2 |

Fig. 4a

PRIOR ART

| GEAR STEP | STANDARD CONFIGURATION WITH 12 GEARS | |
|---|---|---|
| 1 GEAR | 6<-->7 | GATE S2/3<-->GATE S1/R |
| 2 GEAR | 5<-->7 | GATE S2/3<-->GATE S1/R |
|  | 6<-->8 | GATE S2/3<-->GATE S1/R |
| 3 GEAR | 4<-->7 | GATE S2/3<-->GATE S1/R |
|  | 5<-->8 | GATE S2/3<-->GATE S1/R |
| 4 GEAR | 3<-->7 | GATE S2/3<-->GATE S1/R |
|  | 4<-->8 | GATE S2/3<-->GATE S1/R |

Fig. 4b

PRIOR ART

AUTOMATIC GROUP TRANSMISSION

This application is a National Stage completion of PCT/EP2008/052163 filed Feb. 22, 2008, which claims priority from German patent application serial no. 10 2007 010 828.3 filed Mar. 6, 2007.

FIELD OF THE INVENTION

The invention concerns an automated group transmission.

BACKGROUND OF THE INVENTION

Group transmissions with a multi-gear main transmission, an upstream group in drive connection upstream from the latter and a range-change group in drive connection downstream thereof, have been known for a long time and are preferably used in utility vehicles. By designing the upstream group, which usually has two stages and can also be called the splitter group, with a small transmission ratio interval, the transmission ratio intervals between the transmission ratio steps of the main transmission are approximately halved and the total number of transmission ratio steps available is thus doubled. By virtue of a usually two-stage range-change group, the spread of the transmission, as a whole, is substantially increased and the total number of transmission ratio steps is again doubled. Hence, in combination with a three-step main transmission (with three forward gears and a reverse gear), a 12-gear group transmission (with a total of 12 forward gears and a maximum of 4 reverse gears) is obtained, and in combination with a four-stage main transmission (with four forward gears and one reverse gear) a 16-gear group transmission (with a total of 16 forward and a maximum of 4 reverse gears) is obtained.

Compared to an individual transmission with a comparable number of gears and similar gear steps and spread, the group transmission has far more compact dimensions and a lower weight. However, since many of the shift operations in a group transmission entail changing transmission ratio steps in more than one of the partial-transmissions, and therefore take place in a relatively complex manner, most of the known group transmissions are designed to be shifted by either partial or full automation.

A review of automated group transmissions by the present Applicant has been published in ATZ 9/2004 on pages 772-783. From the model series known as the AS-Ironic family of automated shift transmissions, the AS-Ironic-mid series transmissions designed for medium-weight utility vehicles and the AS-Ironic transmissions provided for heavy utility vehicles are known, in each case designed as group transmissions with a multi-step main transmission, i.e., one comprising three or four forward gears, a two-stage splitter group upstream from the main transmission, and a two-stage range-change group downstream from the main transmission.

In each case, the main transmission is of a countershaft design, being provided with unsynchronized claw-type clutches and, in the case of the AS-Tronic-mid series, comprises a single countershaft. For reasons to do with weight and structural space optimization, the transmissions of the AS-tronic series have two countershafts. In both series, the main transmission is optionally available in a direct-gear version ($i_{HG\_min}=1$) or in a fast-gear version ($i_{HG\_min}<1$).

In each case, the splitter group is designed as an upstream transmission with two shiftable input constants for the main transmission. In each case, the range-change group is designed as a two-stage planetary transmission which can be shifted between a direct connection mode ($i_{BG}=1$) and an alternative, high transmission ratio ($i_{BG}\gg1$).

Other group transmission designs, in each case with a main transmission, an upstream splitter group and a downstream range-change group, are known from DE 101 43 994 A1, for example.

In the group transmissions of the AS-Ironic and AS-Tronic-mid series, until now the shifting clutches of the splitter group and of the range-change group, in each case combined in a common shifting packet, are all of synchronized design, while in contrast the main transmission is designed for claw-type shifting, i.e., to be shifted without synchronization. However, since synchronized shifting clutches are expensive, because of their complex structure, take up a relatively large amount of structural space, and limit the life of the transmission as a whole because of wear, it is intended in future designs of such group transmissions to design the range-change group, in addition to the main transmission, with claw-shifting means.

By way of example, FIGS. 3a and 3b show schematically the structure of the group transmissions of the AS-Ironic series known per se. The main transmission HG is made as a direct-gear transmission of countershaft design and has a main shaft W2 and two countershafts W3a, W3b. In the version shown in FIG. 3a, the main transmission HG is a four-step transmission with four transmission ratio steps G1 to G4 for forward driving and a transmission ratio step R for reversing. In the version shown in FIG. 3b, the main transmission HG is formed as a three-stage transmission with three transmission ratio steps G1 to G3 for forward driving and a transmission ratio step R for reversing.

The loose wheels of the transmission ratio steps G1, G2, G3, R and G1, G2, R, respectively, are in each case mounted to rotate on the main shaft W2 and can be engaged by means of associated claw clutches. The associated fixed wheels are arranged rotationally fixed on the countershafts W3a or W3b. The highest transmission ratio step G4 or G3, respectively, in each case made as a direct gear, can be engaged by means of a direct-shift clutch. So far as possible, in each case two shifting clutches at a time are combined in a common shifting packet S1/2, S3/4 or S1/R, S2/3. In the version shown in FIG. 3a, the shifting packet SR comprises only the shifting clutch of the transmission ratio step R for reversing.

The upstream group VG is of a two-stage design and is also made with countershafts, such that the two transmission ratio steps K1 and K2 form two shiftable input constants for the main transmission HG. By virtue of a small ratio difference between the two transmission ratio steps K1, K2, the said upstream group VG constitutes a splitter group. The loose wheel of the first transmission ratio step K1 is mounted to rotate on the input shaft W1, which is connected to a drive motor, in the form of an internal combustion engine, by a controllable separator clutch located outside the area covered by the representations shown in FIGS. 3a and 3b. The loose wheel of the second transmission ratio step K2 is mounted to rotate on the main shaft W2. The fixed wheels of the two transmission ratio steps K1, K2 are respectively arranged rotationally fixed to the countershafts W3a, W3b on the input side. The shifting clutches of the splitter group VG, which are of a synchronized design, are combined in a common shifting packet SV.

The range-change group BG, in drive connection on the downstream side, is also of a two-stage design, but is a planetary structure with a single planetary gearset. The sun gear PS is rotationally fixedly connected to the main shaft W2 on the output side. The planetary gear carrier PT is rotationally fixedly connected to the output shaft W4 of the group transmission. The annular gear PH is connected to a shifting packet SB comprising two shifting clutches, by means of which the range-change group BG can be shifted alternatively to a slow-drive stage L, by connecting the annular gear PH to a fixed part of the housing, or to a fast-drive stage S, by connecting the annular gear PH to the planetary gear carrier PT. In contrast to the previous design mode of AS-Ironic transmissions, the shifting clutches of the shifting packet SB are, in this case, of unsynchronized design.

In a group transmission of this type, owing to the unsynchronized design of the range-change group BG, a special shifting sequence is needed, which is distinctly different from that of a largely identical group transmission, but one provided with a synchronized range-change group BG. A suitable method for controlling shifts, in a group transmission with an unsynchronized range-change group BG, is known from DE 101 52 857 A1, for example. In this method, it is essentially provided that for a range shift, the splitter group VG and the range-change group BG are each first shifted to their neutral position in order to interrupt the force flow, the main transmission HG is then braked by a transmission brake, and the adjustment of the speed of the drive motor to the synchronous speed of the target gear begins. After the shifting of the main transmission HG, the splitter group VG is shifted by synchronization to its target transmission ratio. When the drive motor has reached the synchronous speed, the target transmission ratio of the range-change group BG is engaged.

Since in a range shift, the main transmission HG is shifted in the opposite direction to the range-change group BG, i.e., for an upshift of the range-change group BG, from the slow-driving stage L to the fast-driving stage S, the main transmission HG is shifted from a high transmission ratio, such as G4 or G3, to a lower ratio, such as G1 or G2, with the arrangement of transmission ratio steps in ascending or descending sequence as has been usual until now, a change is always necessary between two shift gates and the shifting packets associated with these. This relationship is summarized in the tables of FIGS. 4a and 4b, for the group transmissions shown in FIGS. 3a and 3b for various gear intervals. Since an automated gate change, in each case, entails controlling and stopping the associated adjusting drive, sensing that the first shifting packet is in the neutral position, switching between the two gates or shifting packets and controlling and sensing the adjusting drive in the target shift position(s) of the second shifting packet, a gate change has a disadvantageous delaying effect on the shift sequence as a whole.

SUMMARY OF THE INVENTION

Against this background the purpose of the present invention is to indicate a group transmission of the type mentioned at the start, with which a range shift can be carried out more rapidly than before.

According to this, the invention relates to an automated group transmission with a multi-stage main transmission, a splitter group connected upstream from the main transmission and a two-stage range-change group connected downstream from the main transmission, the splitter group being connected, via a controllable separator clutch, to a drive motor in the form of an internal combustion engine, the main transmission and the range-change group being of synchronized or unsynchronized design, and the shifting clutches in at least one of the partial-transmissions, in each case of two ratio steps, being respectively combined in a common shifting packet with two shift positions and a neutral position. In this transmission, it is also provided that the shifting clutches associated with the lowest transmission ratio step and with the highest transmission ratio step are combined in a common shifting packet in the main transmission.

Accordingly, in terms of shifting the respective lowest transmission ratio step and highest transmission ratio step are associated with the same shift gate. This brings the advantage that all range shifts, in which a change takes place between the lowest and highest transmission ratio steps in the main transmission, can be carried out there within the same shift gate, simply by switching over the concerned shifting packet from one shift position to the other shift position. A change between two shift gates or two shifting packets, which was usual with the previous arrangement of gearsets and their association with the shifting packets, is thereby avoided so that the total shifting time, for a range shift and therefore also the traction-force-free phase during the range shift, are shorter. Shifts of the group transmission which do not involve a shift in the range-change group BG do not entail any time delay, since the gate change takes place during the synchronization of the main transmission.

In one design of the group transmission, it is provided that to connect the input shaft of the splitter group to the main shaft, a direct shifting clutch arranged axially on the input side is provided. According to another feature of the invention, the group transmission has two countershafts arranged parallel to one another.

BRIEF DESCRIPTION OF THE DRAWINGS

To clarify the invention, the description of a drawing with example embodiments is attached. The drawing shows:

FIG. 2a: A tabulated summary of the range shifts of the group transmission shown in FIG. 1a;

FIG. 2b: A tabulated summary of the range shifts of the group transmission shown in FIG. 1b;

FIG. 4a: A tabulated summary of the range shifts of the group transmission shown in FIG. 3a; and FIG. 4b: A tabulated summary of the range shifts of the group transmission shown in FIG. 3b.

DETAILED DESCRIPTION OF THE PREFERRED EMBODIMENTS

Figure 1A:
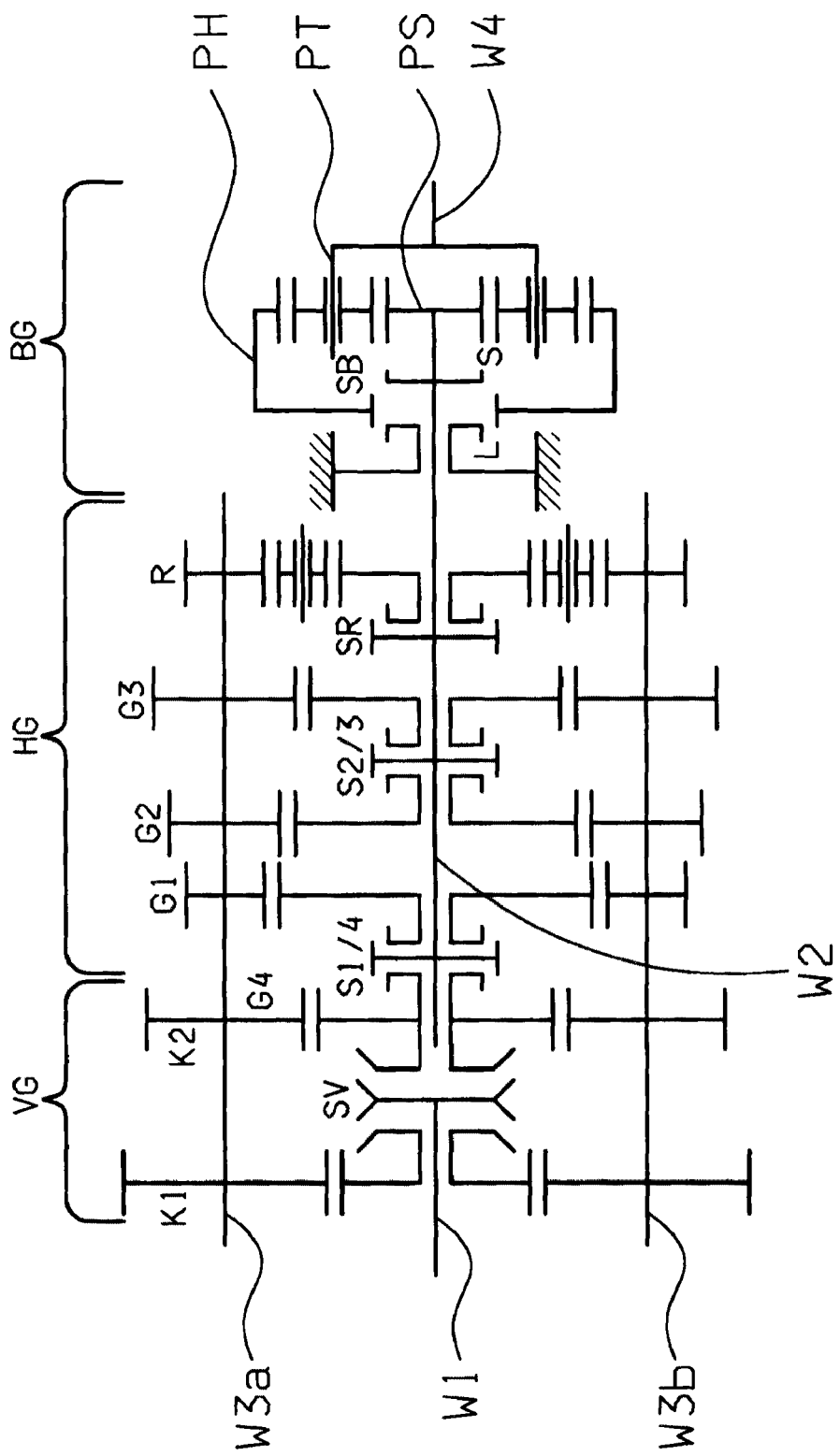
FIG. 1a: A schematic representation of the structure of a group transmission according to the invention, with a four-stage main transmission.
Figure 1B:
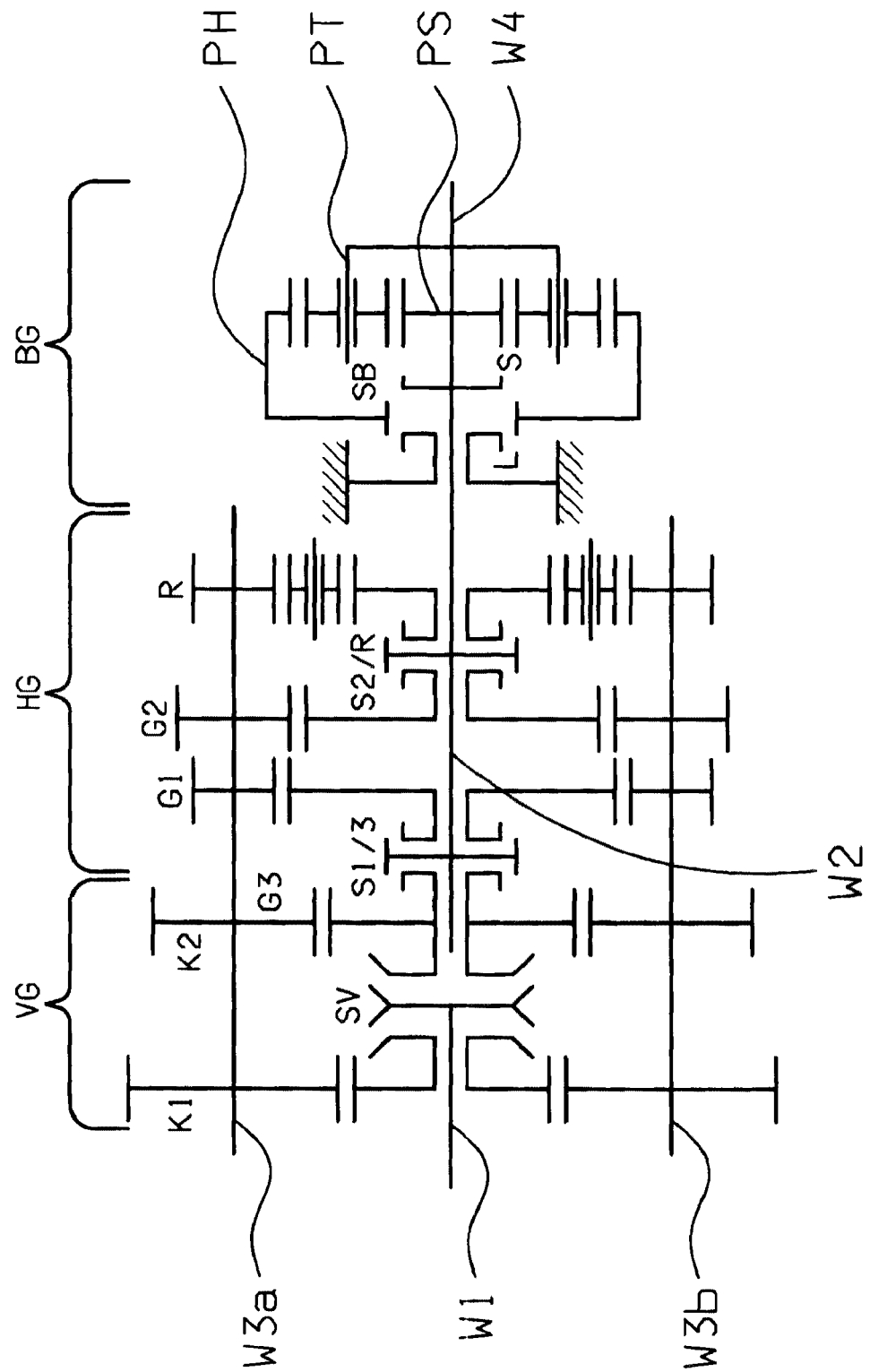
FIG. 1b: A schematic representation of the structure of a group transmission according to the invention, with a three-stage main transmission.

FIGS. 1a and 1b show schematic representations of example structures of the group transmissions according to the invention. The main transmission HG is of countershaft design and has a main shaft W2 and two countershafts W3a, W3b. In the embodiment according to FIG. 1a, the main transmission HG is a four-stage transmission with four transmission ratio steps G1 to G4 for forward driving and one transmission ratio R for reversing. In the version according to FIG. 1b, the main transmission HG is a three-stage transmission with three transmission ratio steps G1 and G3 for forward driving and one transmission ratio R for reversing.

The loose wheels of the transmission ratio steps G1, G2, G3 and R or G1, G2 and R, respectively, are in each case mounted to rotate on the main shaft W2 and can be engaged by means of claw clutches. The associated fixed wheels are arranged rotationally fixed on the two countershafts W3a and W3b. The respective highest transmission ratio step G4 or G3, made in each case as a direct gear, can be engaged by a direct-shift clutch.

Figure 3A:
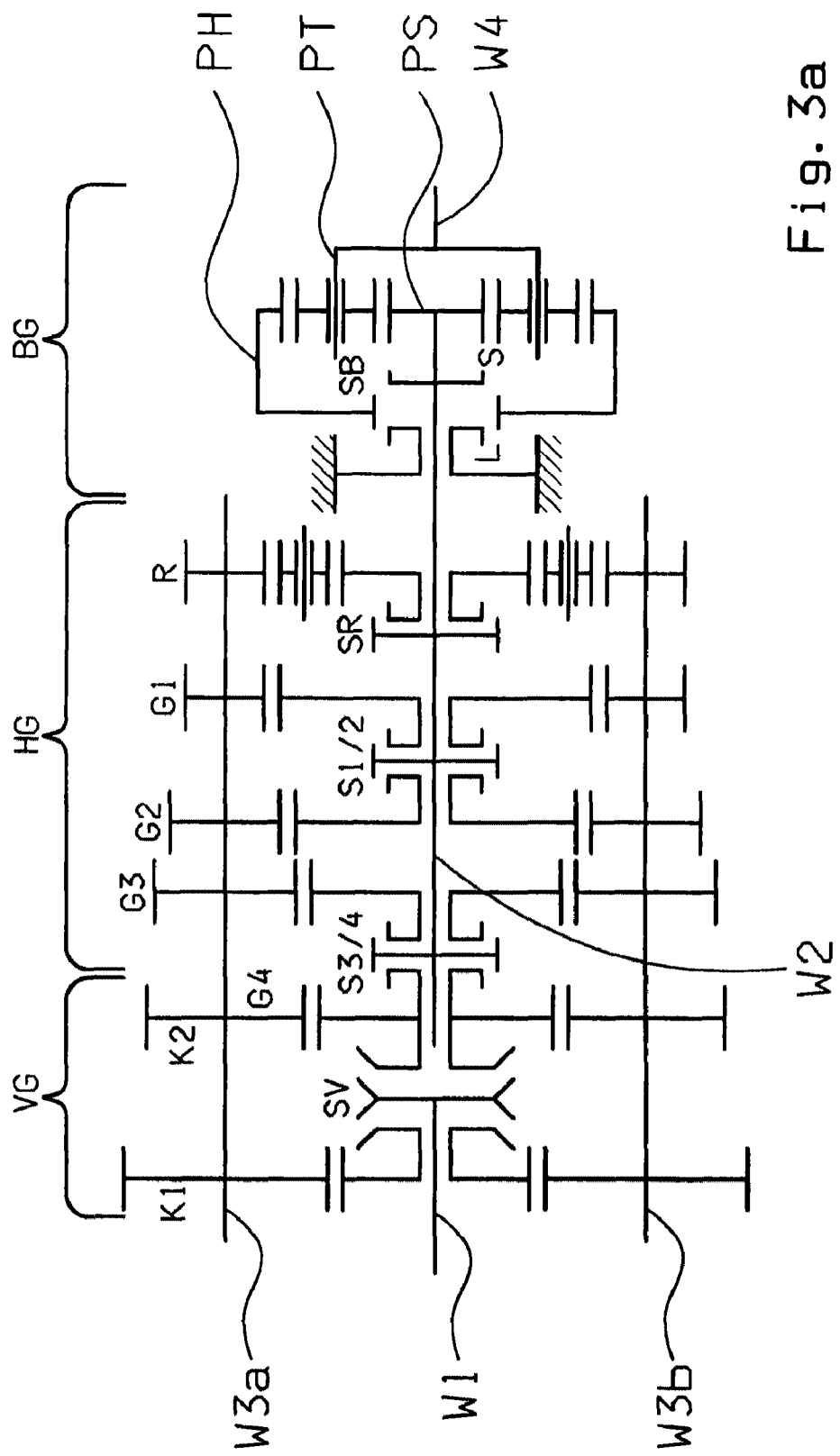
FIG. 3a: A schematic representation of the structure of a known group transmission with a four-stage main transmission.
Figure 3B:
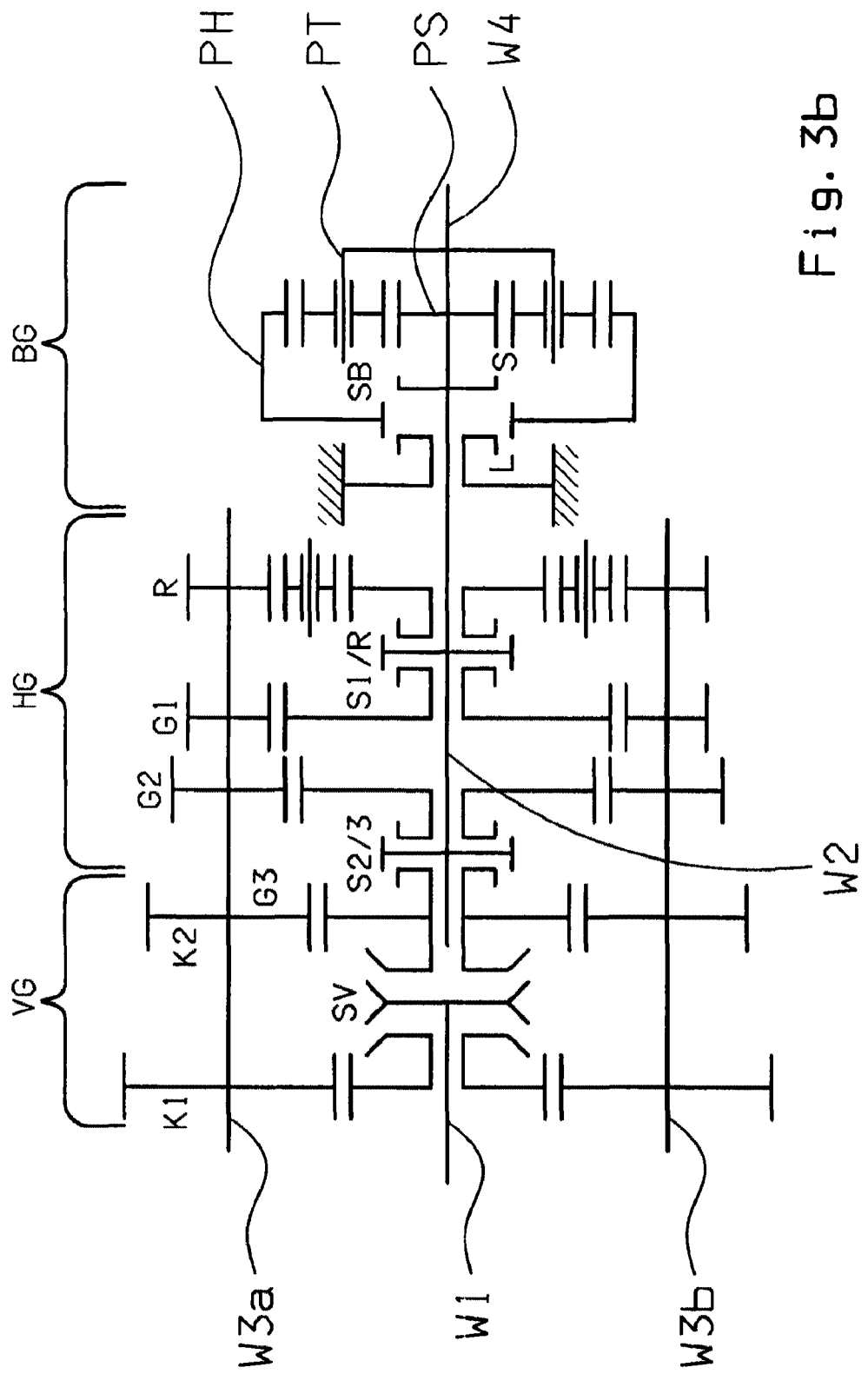
FIG. 3b: A schematic representation of the structure of a known group transmission with a three-stage main transmission.

In contrast to the known embodiments of group transmissions described earlier and shown in FIGS. 3a and 3b, in the main transmission HG according to the invention, the gearset of the lowest transmission ratio step G1 is now arranged on the input side next to the direct-shift clutch SV of the respective direct gear G4 or G3, and the shifting clutches of the first transmission ratio step G1 and the direct gear G4 or G3 are, in each case, combined in a common shifting packet S1/4 or S1/3. The shifting clutches of the other transmission ratio steps are correspondingly combined in shifting packets S2/3, SR or S2/R.

The upstream group VG is of a two-stage design, also with countershafts, such that the two transmission ratio steps K1 and K2 form two shiftable input constants of the main transmission HG. By virtue of a small ratio difference between the two transmission ratio steps K1, K2, the said upstream group VG constitutes a splitter group. The loose wheel of the first transmission ratio step K1 is mounted to rotate on the input shaft W1 which, in the area not covered by the representations in FIGS. 1a and 1b, is connected via a controllable separator clutch to a drive motor in the form of an internal combustion engine. The loose wheel of the second transmission ratio step K2 is mounted to rotate on the main shaft W2. The fixed wheels of the two transmission ratio steps K1 and K2 are respectively arranged on the countershafts W3a and W3b on the input side. The shifting clutches of the splitter group VG, which are of synchronized design, are combined in the common shifting packet SV.

The range-change group BG, in drive connection downstream from the main transmission HG, is also of a two-stage design, but of planetary structure with a single planetary gearset. However, the range-change group BG can also be designed with countershafts. The sun gear PS is connected rotationally fixed to the main shaft W2 on the output side. The planetary gear carrier PT is rotationally fixedly coupled to the output shaft W4 of the group transmission. The annular gear PH is connected to a shifting package SB with two shifting clutches, by means of which the range-change group BG can be shifted alternatively to a slow-driving stage, by connecting the annular gear PH to a fixed part of the housing, or to a fast-driving stage S, by connecting the annular gear PH to the main shaft W2 or to the sun gear PS. Alternatively, in a fast-driving stage S (not illustrated), a shift connection can be formed between the annular gear PH and the planetary carrier PT. To save costs, the shifting clutches of the shifting packet SB are of unsynchronized design.

By virtue of the structure of the group transmissions according to the invention shown in FIGS. 1a and 1b, in particular the arrangement of the gearsets of the transmission ratio steps G1, G2, G3, R or G1, G2, R and the assignment of the shifting packets S1/4 or S1/3 in the respective main transmissions HG, most range shifts can now be carried out without a change of the shift gate or the shifting packet and, therefore, substantially more quickly compared with known group transmissions with a standard arrangement of the transmission ratio steps in ascending or descending sequence. This relationship is summarized in the tables, shown in FIGS. 2a and 2b, respectively, for various gear intervals for the group transmissions according to FIGS. 1a and 1b.

INDEXES
BG Range-change group
G1 (First) transmission ratio step (of HG)
G2 (Second) transmission ratio step (of HG)
G3 (Third) transmission ratio step (of HG)
G4 (Fourth) transmission ratio step (of HG)
HG Main transmission
$i_{BG}$ Transmission ratio of BG
$i_{HG}$ Transmission ratio of HG
$i_{HG\_min}$ Lowest transmission ratio of HG
K1 (First) transmission ratio step (of VG)
K2 (Second) transmission ratio step (of VG)
L Slow-driving stage (of BG)
PH Annular gear (of BG)
PS Sun gear (of BG)
PT Planetary gear carrier (of BG)
R Transmission Ratio (of HG) for reversing
S Fast-driving stage (of BG)
SB Shifting packet (of BG)
SR Shifting packet (of HG)
SV Shifting packet (of VG), direct-shift clutch
S1/2 Shifting packet (of HG)
S1/3 Shifting packet (of HG)
S1/4 Shifting packet (of HG)
S1/R Shifting packet (of HG)
S2/3 Shifting packet (of HG)
S2/R Shifting packet (of HG)
S3/4 Shifting packet (of HG)
VG Upstream group, splitter group
W1 Input shaft
W2 Main shaft
W3a Countershaft
W3b Countershaft
W4 Output shaft

The invention claimed is:

1. A group transmission comprising:
a multi-stage main transmission (HG) having either three forward gears or four forward gears,
a splitter group (VG) being connected upstream of the main transmission (HG), and
a two-stage range-change group (BG) being connected downstream of the main transmission (HG), and
at least one of the multi-stage main transmission (HG), the splitter group (VG) and the range change group (BG) having shifting clutches, such that the splitter group (VG) being connected, via a controllable separator clutch, to a drive motor in the form of an internal combustion engine, the main transmission (HG) and the range-change group (BG) being of synchronized or unsynchronized design, and
the shifting clutches of two respective transmission ratio steps in at least one of the multi-stage main transmission (HG), the group (VG) and (BG) are respectively combined in a common shifting packet with two shift positions and a neutral position,
wherein in the main transmission (HG) the shifting clutches associated with a lowest transmission ratio step (G1) and with a highest transmission ratio step (G4 or G3) are combined with one another in a common shifting packet (S1/4 or S1/3).

2. The group transmission according to claim 1, wherein a direct-shift clutch (SV) is provided, which is arranged axially on an input side, for connecting an input shaft (W1) of the splitter group (VG) to a main shaft (W2).

3. The group transmission according to claim 1, wherein the group transmission comprises two countershafts (W3a, W3b).

4. A group transmission comprising:
a multi-stage main transmission (HG) having three forward gears,
a splitter group (VG) being connected upstream of the main transmission (HG), and
a two-stage range-change group (BG) being connected downstream of the main transmission (HG), and
at least one of the multi-stage main transmission (HG), the splitter group (VG) and the range change group (BG) having shifting clutches, such that the splitter group (VG) being connected, via a controllable separator clutch, to a drive motor in the form of an internal combustion engine, the main transmission (HG) and the range-change group (BG) being of synchronized or unsynchronized design, and
the shifting clutches of two respective transmission ratio steps in at least one of the multi-stage main transmission (HG), the splitter group (VG) and the range change group (BG) are respectively combined in a common shifting packet with two shift positions and a neutral position,
wherein in the main transmission (HG) the shifting clutches associated with a lowest transmission ratio step (G1) and with a highest transmission ratio step (G4 or G3) are combined with one another in a common shifting packet (S1/4 or S1/3),
a direct-shift clutch (SV) is provided, which is arranged axially on an input side, for connecting an input shaft (W1) of the splitter group (VG) to a main shaft (W2), and
the group transmission comprises two countershafts (W3a, W3b).

5. A group transmission comprising:
a multi-stage main transmission (HG) having four forward gears,
a splitter group (VG) being connected upstream of the main transmission (HG), and
a two-stage range-change group (BG) being connected downstream of the main transmission (HG), and
at least one of the multi-stage main transmission (HG), the splitter group (VG) and the range change group (BG) having shifting clutches, such that the splitter group (VG) being connected, via a controllable separator clutch, to a drive motor in the form of an internal combustion engine, the main transmission (HG) and the range-change group (BG) being of synchronized or unsynchronized design, and
the shifting clutches of two respective transmission ratio steps in at least one of the multi-stage main transmission (HG), the splitter group (VG) and the range change group (BG) are respectively combined in a common shifting packet with two shift positions and a neutral position,
wherein in the main transmission (HG) the shifting clutches associated with a lowest transmission ratio step (G1) and with a highest transmission ratio step (G4 or G3) are combined with one another in a common shifting packet (S1/4 or S1/3),
a direct-shift clutch (SV) is provided, which is arranged axially on an input side, for connecting an input shaft (W1) of the splitter group (VG) to a main shaft (W2), and
the group transmission comprises two countershafts (W3a, W3b).

* * * * *